United States Patent
Wu

(10) Patent No.: US 6,442,341 B1
(45) Date of Patent: Aug. 27, 2002

(54) SIMPLE-TYPE FLUID HEATING TUBE STRUCTURAL ARRANGEMENT

(76) Inventor: Chia-Hsiung Wu, P.O. Box No.6-57, Chung-Ho City, Taipei Hsien 235 (TW)

( * ) Notice: Subject to any disclaimer, the term of this patent is extended or adjusted under 35 U.S.C. 154(b) by 0 days.

(21) Appl. No.: 09/721,990

(22) Filed: Nov. 27, 2000

(51) Int. Cl.⁷ .................................................. F24H 1/10
(52) U.S. Cl. ....................................... 392/479; 392/502
(58) Field of Search ................................ 392/479, 480, 392/483, 484, 487, 489, 490, 493, 494, 502

(56) References Cited

U.S. PATENT DOCUMENTS

| | | | | |
|---|---|---|---|---|
| 2,905,447 A | * | 9/1959 | Huet | 165/165 |
| 4,255,646 A | * | 3/1981 | Dragoy et al. | 392/396 |
| 4,371,777 A | * | 2/1983 | Roller et al. | 392/480 |
| 5,174,371 A | * | 12/1992 | Grillo | 165/171 |
| 5,198,640 A | * | 3/1993 | Yang | 219/530 |
| 5,724,478 A | * | 3/1998 | Thweat | 392/484 |

* cited by examiner

Primary Examiner—Mark Paschall
Assistant Examiner—Thor Campbell
(74) Attorney, Agent, or Firm—Troxell Law Office PLLC

(57) ABSTRACT

A simple-type fluid tube structural arrangement providing a heating tube that directly heats a fluid in an uncomplicated structural configuration that achieves the objectives of affording convenience and efficient heating which consists of an aluminum extruded and drawn heating body. A horizontally oriented flow hole passes through one side of the heating body and a casement is disposed adjacent to the other side. Installed in the interior section of the casement is a regulating temperature coefficient ceramic resistor constituting a heat generator and, furthermore, a malleable side is formed at the two sides of the said casement for squeeze mounting the heat generator. Moreover, a connective opening is formed at the front and rear ends of the said flow hole. As such, due to the simpler configuration and the close proximity of the heat generator against the flow hole, the present invention achieves simplified assembly and installation, while providing a heating tube that efficiently heats fluids.

12 Claims, 4 Drawing Sheets

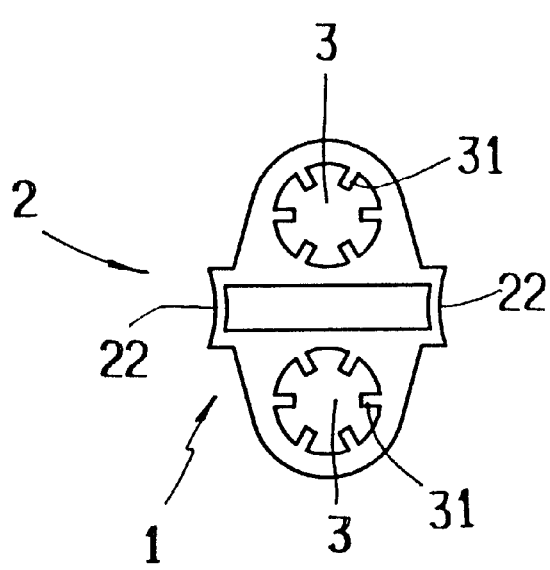
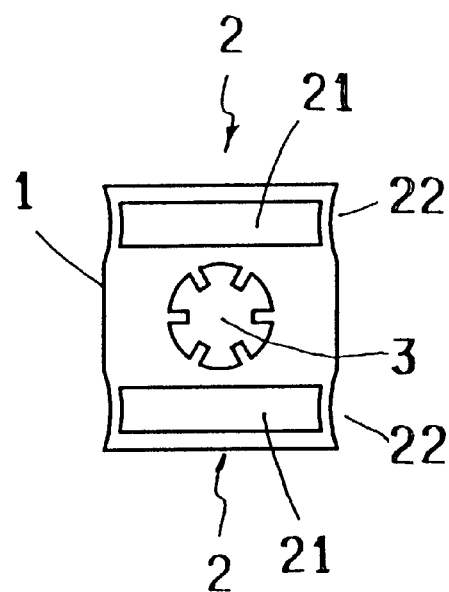
FIG.8  FIG.10
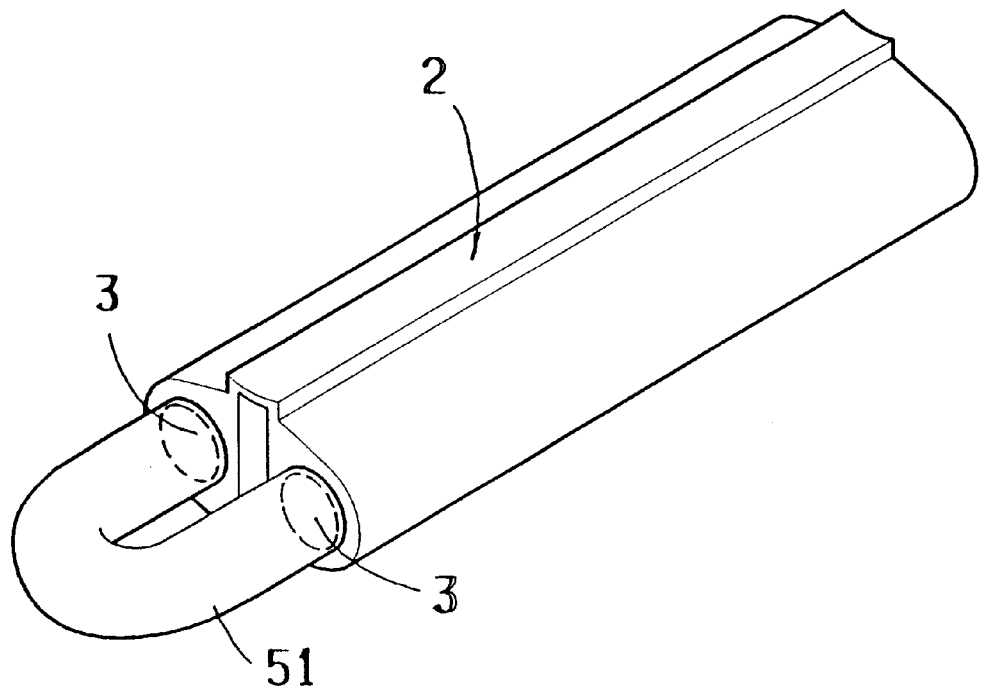
FIG.9

SIMPLE-TYPE FLUID HEATING TUBE STRUCTURAL ARRANGEMENT

BACKGROUND OF THE INVENTION

1) Field of the Invention

The invention herein relates to a simple-type fluid tube structural arrangement providing a heating tube capable of directly heating a fluid in an uncomplicated structural configuration, thereby achieving the objectives of affording convenience and efficient heating which consists of an aluminum extruded and drawn heating body, wherein a horizontally oriented flow hole passes through one side of the heating body and a casement is disposed adjacent to the other side; installed in the interior section of the casement is a regulating temperature coefficient ceramic resistor constituting a heat generator and, furthermore, a malleable side is formed at the two sides of the said casement for squeeze mounting the heat generator; moreover, a connective opening is formed at the front and rear ends of the said flow hole; as such, due to the simpler configuration and the near proximity of the heat generator against the flow hole, the present invention achieves simplified assembly and installation and provides a heating tube capable of efficiently heating fluids.

2) Description of the Prior Art

Conventional fluid heating tubes consist of a pipe in which a flowing fluid is heated, with a tubular heater utilized to heat the flowing fluid consisting of a tubular body, and heaters of various forms situated around the exterior periphery or an external open flame heat source that indirectly heats the liquid in the interior section of the said tubular body; however, most of the said conventionally utilized heating tubes are typically electric heating resistor coils wound around the exterior peripheral surface of the said tubular body such that the thermal energy produced by the conductance of electric current is indirectly guided into the interior section of the said tubular body and since a female insert, ceramic, or other insulative material must be placed in between the said wound electric heating coils and the said tubular body, a direct coupling effect is not possible, resulting in heat isolation and loss as well as the easy oxidation of electric heating coils and the need to place the temperature control device to accommodate such an occurrence, inconvenient utilization, and high production cost; furthermore, electrical leakage hazards readily occur, maintenance is difficult, and several units cannot be connected for application convenience; therefore, the invention herein utilizes an aluminum extrusion approach to form the heating body, a horizontally oriented flow hole passing through one side of the said heating body provides for fluid flow, and situated against one side of the said flow hole is a squeeze mounted regulating temperature coefficient ceramic resistor constituting a heat generator; the heat conducting properties of the aluminum metal material of the heat body as well as the constant temperature capability of the said heat generator combined with the temperature transfer characteristics of the heating body enable the said flow hole to supply unidirectional thermal energy to achieve direct heating, which along with rapid assembly and installation as well as flexible utilization are the primary objectives of the present invention.

SUMMARY OF THE INVENTION

Another objective of the invention herein is the forming of heat exchange rib plates along the interior section of the flow hole of the said heating body and the rib plates can be of other cut surface contours to provide the heat exchange efficiency actually required.

Still another objective of the invention herein is that the interior section of the flow hole can be filled with wires or other components capable of heat exchange.

Yet another objective of the invention herein is that a heat resistance shield is disposed over the exterior surface of the said heating body to isolate temperature from being dissipated away.

A further objective of the invention herein is that the flow hole of the said heating body can be disposed along the two sides of the said casement.

An additional objective of the invention herein is that the casement of the said heating body can be disposed symmetrically to heat a single flow hole.

The detailed content of the invention herein is accompanied for purposes of reference by the brief description of the drawing below.

BRIEF DESCRIPTION OF THE DRAWINGS

FIG. 8 is an orthographic drawing of another embodiment of the invention herein.

FIG. 9 is an isometric drawing of another application embodiment of the invention herein.

FIG. 10 is an orthographic drawing of yet another embodiment of the invention herein.

DETAILED DESCRIPTION OF THE INVENTION

Figure 1:
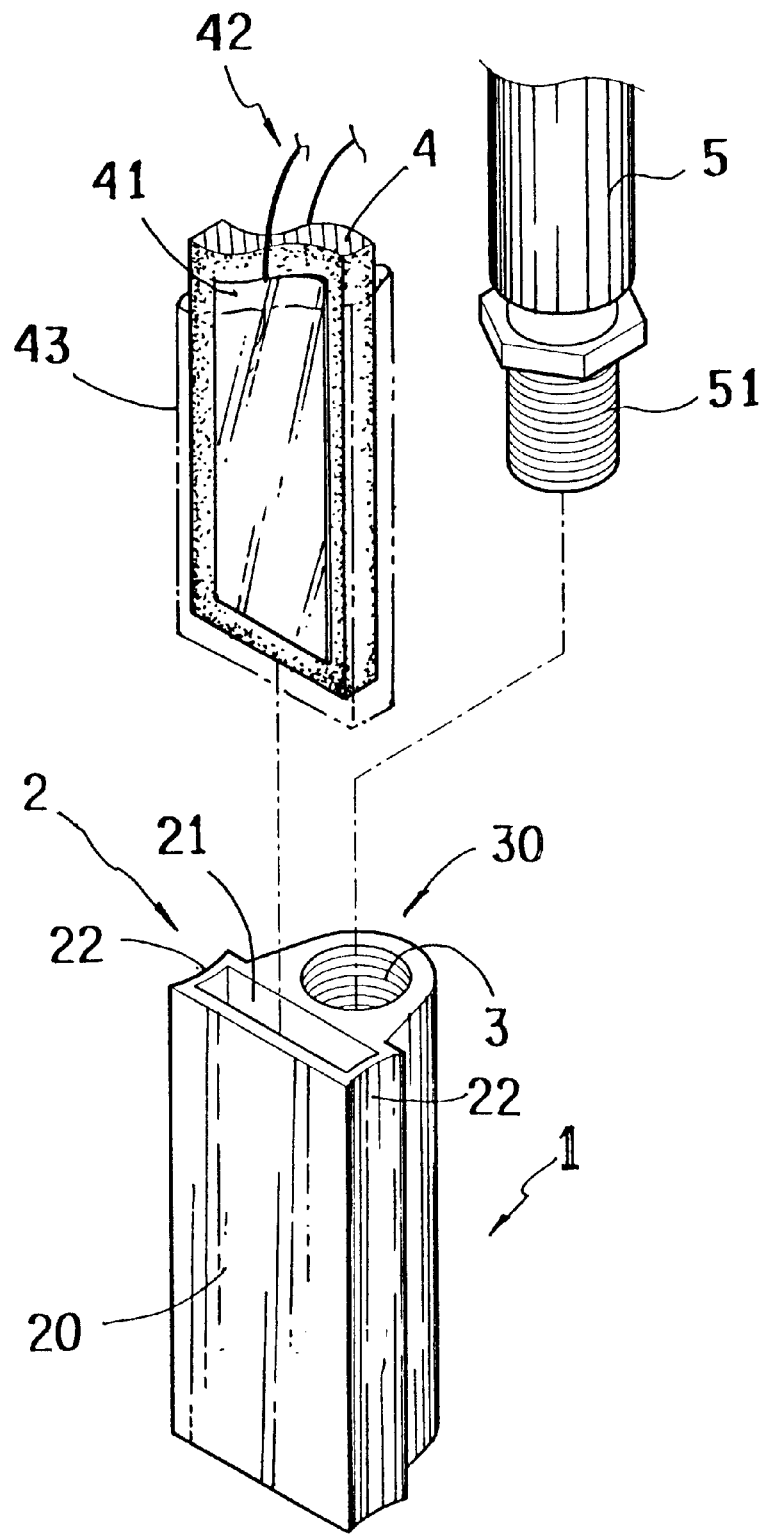
FIG. 1 is an exploded drawing of the invention herein.

Referring to FIG. 1, the simple-type fluid tube structural arrangement of the invention that provides a fluid heating tube of an uncomplicated structural configuration and, furthermore, effectively increases the temperature of a fluid, the present invention consists of an aluminum extruded and drawn heating body 1 having a horizontally oriented flow hole 3 passing through one side, a connective opening 30 formed at the front and rear ends of the said flow hole 3, a casement 2 proceeding through in parallel adjacent to the said flow hole 3, and an emplacement trough 21 within the interior section of the said casement 2 having a malleable side 22 formed at its two lateral aspects, with the said emplacement trough 21 providing for the installation of a regulating temperature coefficient ceramic resistor constituting a PTC heat generator 4, of which a conductive element 41 is attached to the two sides of the said heat generator 4, its wires 42 are in continuity with a power supply, and the outer periphery is encapsulated by an insulative heat conductive coating 43, and after installation into the said emplacement trough 21, pressure is applied to all sides of the said casement 2 to achieve a smooth even exterior surface such that after the said malleable sides 22 are deformed, the said heat generator 4 is effectively squeezed mounted within the interior section of the casement 2; and connective openings 30 are formed in the flow holes 3 which provide for directing liquid flow via connector components 51 and tube components 5, or the said connector component 51 can provide for inseries coupling to another heating body, thereby effectively enabling series heating or utilization for conjoining other heating tubes and, furthermore, tight conjoinment can be achieved by any arrangement whatsoever between the said connective openings 30 and the said connective tubes.

Figure 2:
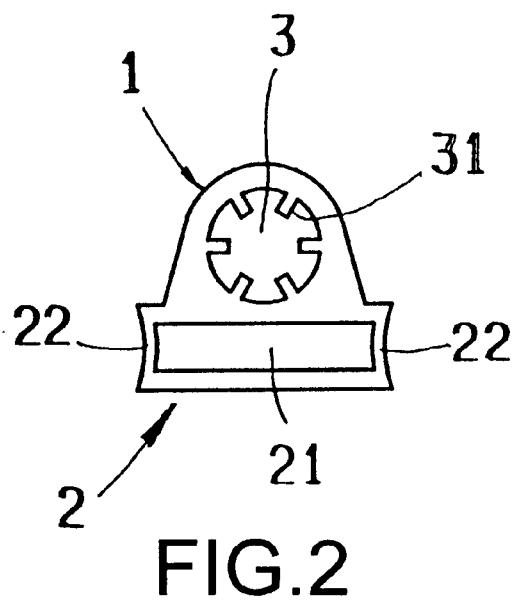
FIG. 2 is a cross-sectional drawing of the structure of the invention herein.

Referring to FIG. 2, inward extending heat exchange rib plates 31 are situated along the inner periphery of the flow hole 3 formed in the interior section of the said heating body 1, with the said heat exchange rib plates 31 existent within the interior section of the said flow hole 3 increasing the surface area of heat exchange such that the said generated heat increases the temperature of the fluid in the interior section of the flow hole 3 with even greater equalization.

Figure 3:
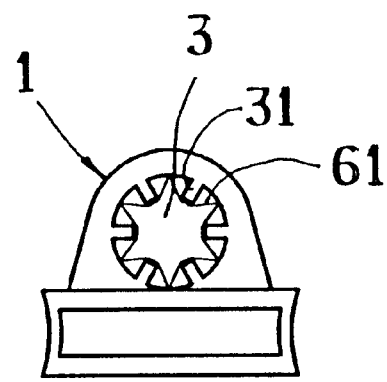
FIG. 3 is the first orthographic drawing of the flow hole filler component of the invention herein.

Referring to FIG. 3, a filler component is ensleeved within the flow hole 3 formed in the interior section of the said heating body 1, with the said filler component being a slope-shaped tubular body 61 and, furthermore, the peaks formed on the said slope-shaped tubular body 61 are inserted in the spaces between the said rib plates 31 and effectively increases the interior section heat exchange capability of the flow hole 3; since the said tubular body 61 is of the same heat absorptive material, after being ensleeved within the interior section of the flow hole 3, since the outer surface of the said slope-shaped tubular body 61 is attached under pressure to the inner surface of the said flow hole 3 or the outer surface of the heat exchange rib plates 31, additional heat exchange efficiency is obtained.

Figure 4:
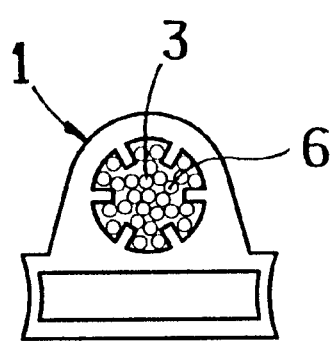
FIG. 4 is the second orthographic drawing of the flow hole heat absorption component of the invention herein.

Referring to FIG. 4, a plurality of filler wire rods 6 are similarly situated within the within the flow hole 3 formed in the interior section of the said heating body 1, with the said filler wire rods 6 being the same heat absorptive material and, furthermore, their manner of coverage effectively creates damping in the said fluid and increases the heat exchange period and, furthermore, the said filler wire rods 6 are capable of a higher rate of absorption from the said heat source to effectively allow the fluid flowing into the middle section of the flow hole 3 to be equally heated.

Figure 5:
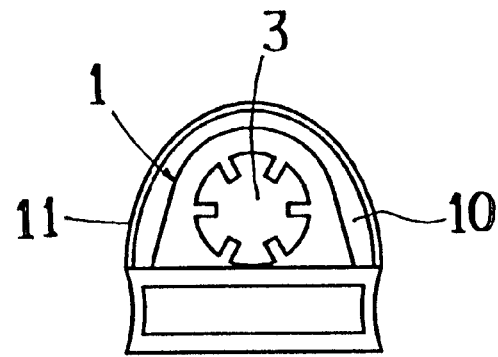
FIG. 5 is an orthographic drawing of the heat resistance shield-related assembly of the invention herein.

Referring to FIG. 5, a thin-profiled heat resistance shield 11 is disposed over the exterior surface of the said heating body 1 such that a heat isolation layer 10 is formed between it and the heating body 1 and, furthermore, the said heat resistance shield 11 utilizes an external addition approach to protect against heat source flow loss.

Figure 6:
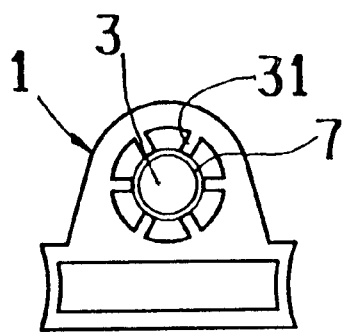
FIG. 6 is an orthographic drawing of the flow hole without a filler in the tube.

Referring to FIG. 6, a heat conductive jacket tube 7 is similarly routed along the inner periphery of the flow hole 3 formed in the interior section of the said heating body 1, with the outer peripheral surface of the said heat conductive jacket tube 7 fastened against the top sections of the said heat exchange rib plates 31 to effectively achieve a more equalized heating of fluid.

Figure 7:
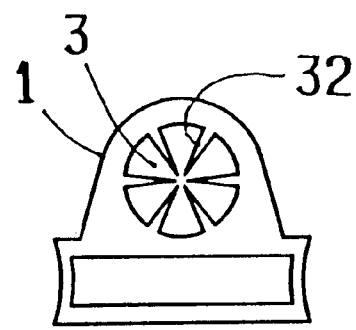
FIG. 7 is an orthographic drawing of the differing forms of the rib plates situated in the flow tube.

Referring to FIG. 7, the rib plates 31 formed along the interior section of the said flow hole 3 can be in the form of a lancet-shaped rib 32, with the blades of the said lancet-shaped ribs 32 near the center of the circle such that after the said fluid flows therein, an equalized heated effect is similarly achieved.

Referring to FIG. 8, the flow hole 3 formed in the said heating body 1 can be disposed utilizing a symmetric approach with the casement 2 situated in between them and, furthermore, malleable sides 22 to ensconce the heat generator are situated between the said facing flow holes 3 such that heat produced by the said casement 2 is transferred in two directions and since the said constituted approach includes a return flow tube 510 (as shown in FIG. 9) to guide the flow, after utilizing the said return flow tube 510 in continuity to redirect the flow, the said heat source performs double-sided absorption.

Referring to FIG. 10, the casement 2 of the said heating body 1 can be disposed in a symmetric manner so both heat a flow hole situated at the center such that within a given scope and specifications, high energy heat is efficiently transferred to the flow hole 3.

Figure 11:
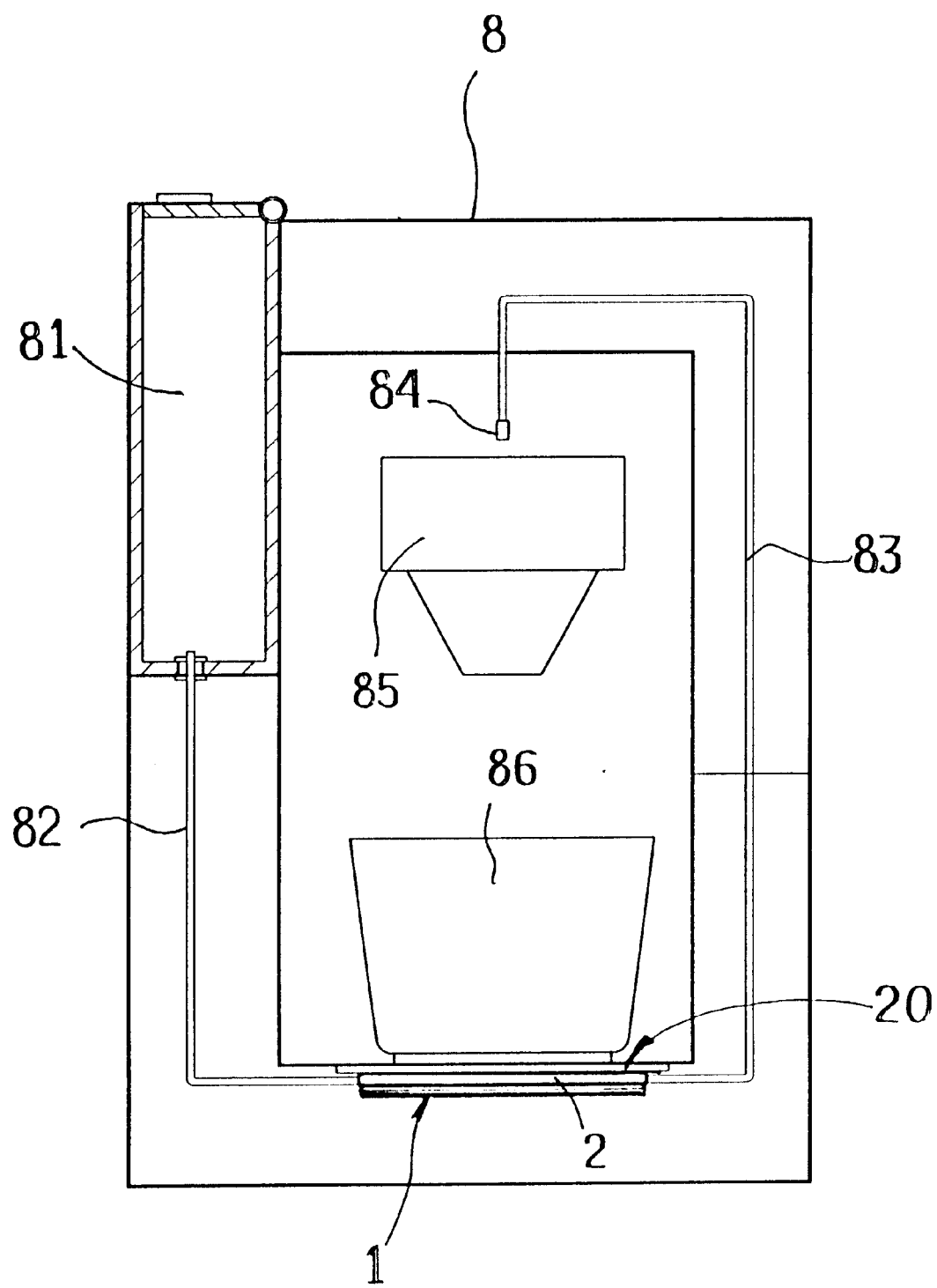
FIG. 11 is an orthographic drawing of the invention herein as utilized in a hot beverage brewing appliance.

Referring to FIG. 11, the said figure depicting the heating body 1 of the invention herein as utilized in a coffee brewing appliance or other hot beverage brewing appliance; as indicated in the figure, the said appliance 8 has a water storage tank 8 at one side, with the said water storage tank 8 connected via a delivery tube 82 to the said heating body 1; the said heating body 1 additionally has a heat diversion tube 83 leading to a delivery end 84 such that water supplied from the said delivery end 84 is outputted after being heated by the heating body 1 and directly drip permeates the tea leaves or coffee grinds in the interior section of the said filter 85, the completed tea or coffee then continues to the container 86 and the said container 86 is positioned on the flat exterior surface of the casement 2 situated at the heating body 1; as such, when the said heating body I is not heating water, temperature maintenance directly occurs at the said container 86, with the said temperature maintenance method (refer to FIG. 1) utilizing the smooth flat surface 20 at one side of the casement 2 situated at the said heating body 1; the said smooth flat surface 20 is situated horizontally at the bottom section of the said container 86 (refer to FIG. 11) providing even contact to indirectly or directly increase the temperature and, furthermore, the said regulated temperature coefficient ceramic resistor constituting the heat generator 4 has constant temperature characteristics and excellent heat transfer efficiency; after the water in the interior section of the said water storage tank 8 has been heated and discharged from the delivery end 84 and not much water is present in the interior section of the said delivery tube 82, evaporation immediately resumes, at which time the said heat generator 4 situated at the said heating body 1 based on the temperature to be attained automatically switches off the power supply and utilizes the temperature maintenance mode, the said heat generator 4 accomplishing this by a predetermined temperature setting and, furthermore, its high efficacy constant temperature characteristics are capable of achieving efficient temperature maintenance performance.

What is claimed is:

1. A fluid tube heating device comprising:
   a) an elongated metallic heating body having opposite ends, and including no more than two fluid flow holes extending therethrough between the opposite ends and at least one emplacement trough located adjacent to one side of the no more than two fluid flow holes, the at least one emplacement trough having a lateral width greater than a corresponding width of the adjacent fluid flow holes, the heating body having malleable, concave side portions bounding opposite sides of the at least one emplacement trough; and,
   b) at least one planar ceramic resistor heating element squeeze mounted in the at least one emplacement trough by deformation of the malleable concave side portions of the heating body.

2. The fluid tube heating device of claim 1 wherein the heating body further comprises a plurality of rib plates extending inwardly into the no more than two fluid flow holes.

3. The fluid tube heating device of claim 2 wherein the plurality of rib plates are lancet shaped.

4. The fluid tube heating device of claim 2 further comprising a filler component located within the no more than two fluid flow holes.

5. The fluid tube heating device of claim 4 wherein the filler component comprises a tubular body.

6. The fluid tube heating device of claim 5 wherein the plurality of rib plates are spaced apart and wherein portions of the tubular body extend into spaces between the plurality of rib plates.

7. The fluid tube heating device of claim 4 wherein the filler component comprises a plurality of wire rods of heat absorbing material.

8. The fluid tube heating device of claim 1 further comprising a heat resistant shield on the heating body and covering a portion of the heating body through which the no more than two fluid flow holes pass.

9. The fluid tube heating device of claim 1 wherein the heating body includes two fluid flow holes.

10. The fluid tube heating device of claim 9 wherein the at least one emplacement trough is located between the two fluid flow holes.

11. The fluid tube heating device of claim 1 wherein the heating body includes two emplacement troughs.

12. The fluid tube heating device of claim 11 wherein one of the no more than two fluid flow holes is located between the two emplacement troughs.

* * * * *